3,526,517
PROCESS FOR PREPARING ICING
John R. Shaffer, Cincinnati, and Gordon F. Brunner and Benjamin Lawrence, Springfield Township, Hamilton County, Ohio, assignors to The Procter & Gamble Company, Cincinnati, Ohio, a corporation of Ohio
Filed Aug. 16, 1967, Ser. No. 661,010
Int. Cl. A23g 3/00
U.S. Cl. 99—139                                                            7 Claims

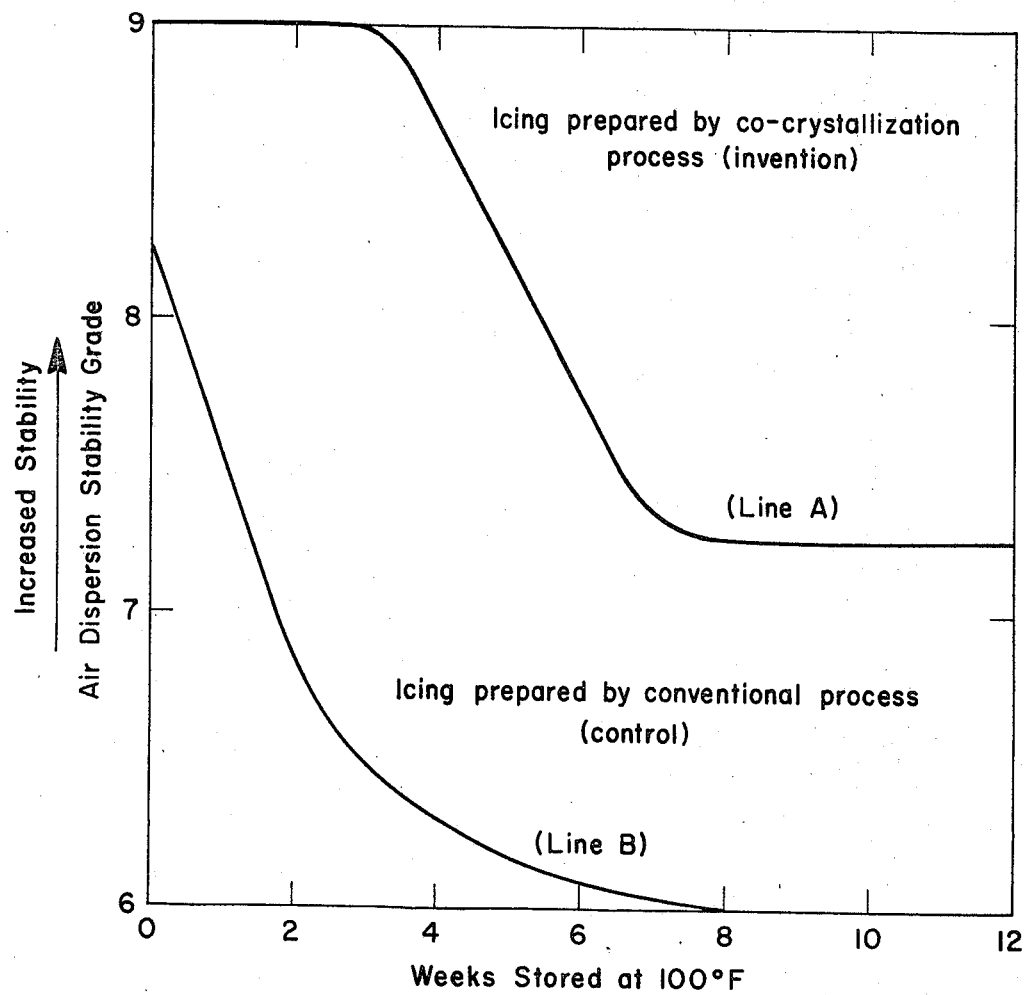

ABSTRACT OF THE DISCLOSURE

A melt of sugar and normally plastic beta-phase shortening is chilled in a scraped wall heat exchanger to form an icing comprising a co-crystallized mixture of sugar and shortening.

BACKGROUND OF THE INVENTION

U.S. Pat. 3,253,928, Bedenk and Dobson, May 31, 1966, discloses a storage-stable non-firming icing comprising sugar, water, and shortening, wherein the shortening is a beta-phase plastic shortening comprising partially hydrogenated glyceride basestock and substantially completely hydrogenated triglyceride beta-phase-tending hardstock. The icing, which can be aerated if desired, remains soft and spreadable after extended periods of storage time.

U.S. Pat. 3,194,666, Bedenk, Brunner and Goodrich, July 13, 1965, discloses that the aeration characteristics of an icing of the type disclosed in U.S. Pat. 3,253,928, can be substantially improved by the employment of certain selected combinations of hardstocks in the shortening component of the icing.

The icing in both of the above-mentioned patents is prepared by the following general method: First, the beta-phase plastic shortening is prepared independently of the other ingredients by forming a completely melted mixture of the basestock and hardstock in the specified proportions. This is accomplished by heating the shortening components to a temperature in excess of 150° F. The melted oil mixture is then pumped through a scraped wall heat exchanger in which the oil is rapidly chilled to a temperature of from about 70° to about 90° F. From the heat exchanger, the chilled supercooled mixture is pumped into containers where the shortening substantially completes its crystallization into the plastic state. Transformation of the shortening solids to beta-phase then takes place over a period of time at certain temperatures in a tempering room. Second, fondant is prepared by dissolving a small amount of hydrophilic colloid in water to form an aqueous stabilizer base to which is added the other icing ingredients except the shortening to form the fondant. As used herein, the term "fondant" is meant to define a mixture of fine particles of sugar and saturated sugar syrup which can contain the other ingredients of the icing except the shortening. Third, the previously prepared beta-phase plastic shortening is then added to the fondant and mixed therewith in a turbine agitator to form the icing. During or after this mixing a substantial portion of air, nitrogen, or other edible gas is beaten into the icing in finely divided form in order to aerate the icing. It is preferable in order to form a smooth, soft, homogeneous icing that the shortening be subjected to intensive high shear mixing prior to its incorporation in the fondant. The high shear mixing mechanically breaks up the crystal matrix to give a fine structure in the shortening whereby it can be readily dispersed in the fondant to form a smooth, creamy icing.

In essence, then, prior art methods of preparing storage-stable, non-firming, aerated icings involve the preparation of a fondant and the subsequent addition thereto of a previously-prepared plastic shortening. The shortening is preferably subjected to intensive shear forces prior to its addition to the fondant in order to facilitate admixture of the shortening with the fondant.

The present invention provides a novel process of preparing storage-stable non-firming aerated icings of the type described in U.S. Pats. 3,253,928 and 3,194,666 whereby the step of adding a previously-prepared plastic shortening to a fondant is avoided. Moreover, and quite unexpectedly, icings prepared by the process of the present invention exhibit substantially increased air dispersion stability as compared to conventionally processed icings.

SUMMARY OF THE INVENTION

The present invention provides a process for the preparation of storage-stable non-firming aerated icings characterized by a step wherein a melt of sugar and normally plastic beta-phase shortening is rapidly cooled in a scraped wall heat exchanger to form a co-crystallized mixture of sugar and shortening. This process, referred to herein as "co-crystallization" offers the following advantages: (1) the normally plastic beta-phase shortening does not need to be formulated, crystallized and tempered prior to admixture with the sugar components of the icing; (2) the prior art step of mixing the shortening in plastic form into the sugar components (fondant) is avoided; likewise, the preferred shearing step of the prior art is avoided; (3) a highly uniform and homogeneous icing product is obtained; and (4) icings prepared by co-crystallization exhibit superior air dispersion stability.

The key step in the present process is the crystallization of a melt comprising sugar and shortening (co-crystallization). The melt can also contain the minor ingredients of the icing but they are preferably added subsequent to the co-crystallization step. The shortening can be any of the plastic shortenings disclosed in U.S. Pats. 3,253,928 or 3,194,666 which contain predominantly beta-phase-tending solids. Thus, a beta-phase conversion step is employed subsequent to co-crystallization. Air can be added to the composition preferably subsequent to the co-crystallization step.

Therefore, as a more specific summary, the present invention provides a process for the preparation of a storage-stable, non-firming aerated icing which comprises:

(a) Heating sugar and normally plastic shortening components comprising from about 50% to about 95% glyceride basestock having an iodine value greater than about 50 and from about 5% to about 50% substantially completed hydrogenated triglyceride hardstock having an iodine value not greater than about 12, at least about 70% of the shortening hardstock being beta-phase-tending; to a temperature greater than about 210°F., to form a melt;

(b) Rapidly chilling the melt of step (a) in a scraped wall heat exchanger to a temperature within the range of from about 55° F. to about 100° F. to form an icing comprising a co-crystallized mixture of sugar and shortening; and (c) Converting at least 70% of the solid phase of the shortening component of the icing of step (b) to the beta-phase, an edible gas having been added to the icing composition subsequent to step (a).

BRIEF SUMMARY OF THE DRAWING

The drawing is a graph of data tabulated in the table following the example, infra. This graph shows the air dispersion stability over a period of several weeks of icing prepared by the co-crystallization process of the present invention (line A) compared to a control icing prepared by a known process not involving co-crystallization (line B).

DESCRIPTION OF THE PREFERRED EMBODIMENTS

The icing composition

Icings prepared by the process of the present invention generally comprise a major amount of sugar and minor amounts of shortening, water, and other ingredients. It is preferable to incorporate the sugar, water, and shortening in the icing formula in proportions as to satisfy the condition that the icing comprises, by weight, from about 45% to about 75% sugar, from about 10% to about 25% water, and from about 5% to about 30% shortening.

The sugar can be any ordinary sugar including sucrose, dextrose, maltose, fructose, lactose, and brown and invert sugars, alone or in combination. Sucrose is preferred.

The shortening can be any of the plastic shortenings disclosed in U.S. Patents 3,253,928 and 3,194,666, i.e., the shortening comprises from about 50% to about 95% glyceride basestock having an iodine value greater than about 50 and from about 5% to about 50% substantially completely hydrogenated triglyceride hardstock having iodine value not greater than 12, at least 70% of the shortening hardstock being beta-phase-tending.

As used herein the term "plastic" shortening defines a shortening which is solid, non-fluid, non-pourable and non-pumpable at room temperature (70° F. to 100° F). Said shortening must have a yield point high enough to prevent product flow at room temperature, that is, it must not only be sufficiently solid to prevent product deformation under its own weight in ordinary commercial unit quantities, but must also be non-pumpable with ordinary commercial pumps which are conventionally used for pumping liquids or fluids at room temperature. In order to satisfy these conditions the shortening must have substantial interlacing of crystalline particles of very small size.

The substantially completely hydrogenated triglyceride hardstock can be essentially beta-phase-tending hardstock or, preferably, it can consist essentially of a mixture of beta-phase-tending hardstock and non-beta-phase-tending hardstock in a weight ratio of from 9:1 to 1:1, at least 70% of the shortening hardstock being beta-phase-tending. Preferably the total of substantially completely hydrogenated triglyceride hardstock constitutes from 25% to 45% by weight of the shortening.

As used herein the term "beta-phase-tending" defines an overall general tendency of certain triglyceride solids to crystallize in a beta-phase; and the term "non-beta-phase-tending" defines an overall general tendency of certain other triglyceride solids to crystallize in a phase other than a beta-phase. This does not mean, however, that under proper conditions triglyceride solids cannot be transformed from a non-beta-phase into a beta-phase.

Examples of beta-phase-tending triglyceride hardstocks which can be used as tristearin, tripalmitin, and symmetrical palmitodistearin. Other suitable triglyceride hardstocks having strong beta-phase-forming tendencies can be derived from substantially completely hydrogenated fats and oils such as lard, sunflower seed oil, safflower seed oil, linseed oil, sesame seed oil, hazelnut oil, soybean oil, peanut oil, olive oil, and corn oil. A preferred beta-phase-tending triglyceride hardstock component is substantially completely hydrogenated soybean oil, suitably having an iodine value of about 8.

The preferred non-beta-phase-tending hardstock component of the shortening is substantially completely hydrogenated rapeseed oil having an iodine value not exceeding 12. This material tends to crystallize in the beta-prime-phase and is known to hinder the formation of beta-phase crystals in a conventional plastic shortening. However, according to the teachings of U.S. Patent 3,194,666, it has been found that substantially completely hydrogenated rapeseed oil gives superior stiffening power to a beta-phase plastic shortening without preventing transformation of substantially all the shortening solids, including the non-beta-phase-tending solids, to beta-phase when used in combination with a beta-phase-tending hardstock in the aforesaid proportions. Other non-beta-phase-tending hardstocks which can be used in the practice of this invention are substantially completely hydrogenated cottonseed oil, and substantially completely hydrogenated fats and oils having a high proportion of fatty acids containing 20 to 24 carbon atoms such as mustard seed oil, salmon oil, herring oil, pilchard oil, menhaden oil and sardine oil.

The basestock of the shortening can be any edible normally liquid glyceride oil or a partially hydrogenated glyceride oil or fat having an iodine value greater than about 50, and preferably less than about 130. Suitable basestock glycerides can be derived from animal, vegetable or marine sources, including naturally-occurring triglyceride oils and fats such as cottonseed oil, soybean oil, peanut oil, peanut oil, coconut oil, palm kernel oil, olive oil, palm oil, corn oil, rapeseed oil, sunflower seed oil, sesame oil, safflower oil, sardine oil, lard and tallow.

Very highly unsaturated oils may require some hydrogenation to improve their resistance to oxidative deterioration. Hydrogenation to reduce the iodine value of these highly unsaturated oils to less than 130 is generally sufficient for the purpose of this invention, though an iodine value of from 75 to 110 is preferred. A preferred basestock, particularly for use when the hardstock is all beta-phase-tending, is partially hydrogenated soybean oil having an iodine value of from 75 to 95.

Other suitable basestock glycerides having iodine values of greater than about 50 for use in the icings prepared by this invention can be derived from natural or synthetic fats and oils containing in the glyceride molecule long chain acyl radicals having from 12 to 24 carbon atoms such as lauroyl, lauroleoyl, myristoyl, myristoleoyl, palmitoyl, palmitoleoyl, stearoyl, oleoyl, linoleoyl, linolenoyl, elaidoyl, arachidoyl, gadoleoyl, arachidonoyl, behenoyl, erucoyl, brassidoyl, clupanodonoyl, lignoceroyl and/or selacholeoyl. A portion of the basestock glyceride also can contain in the molecule one or two short chain acyl groups having from 2 to 10 carbon atoms such as acetyl, propanoyl, butanoyl, pentanoyl and hexanoyl. Suitable basestock also can be derived from randomly and low temperature interesterified fatty triglyceride containing oils and fats such as interesterified cottonseed oil and lard.

Suitable partial hydrogenation of the liquid soybean oil to form the preferred basestock can be carried out by conventional methods and usually consists of a batch process whereby the oil is contacted with hydrogen in the presence of nickel catalyst.

Various triglyceride fats and oils such as lard, tallow, olive oil or peanut oil which normally have iodine values within the preferred range will require little or no additional hydrogenation.

The iodine value (I.V.) of an oil or fat indicates the number of grams of iodine equivalent to the amount of halogen absorbed by a 100 gram sample. In general, the lower the iodine value of a given fat or oil, the greater will be its content of solids at a given temperature. That is, as the triglyceride molecules become more saturated by the addition of hydrogen (or the double bond content decreases), the consistency of the fat or oil becomes more solid. The iodine value can be readily determined by the well-known Wijs method.

A reasonably accurate approximation of the percentage by weight of solids in a sample of fat or oil at any given temperature can be determined dilatometrically by a method described in 31 J. Am. Oil Chemists Society 98–103 (March 1954). The approximation of the solids content of the sample according to this method is stated in terms of a solids content index (S.C.I.). For example, the above-described range of iodine values of from 50 to 130 for the partially hydrogenated glyceride basestock corresponds approximately to a range of solids content index of from 70 to zero at 70° F. It is also preferable to include in the shortening from 2.5% to 5%, by weight, of a mixture of mono- and diglycerides of partially hydrogenated soybean oil having an iodine value of from 75 to 80.

Various other additives can be used with the shortening in the icings prepared by this invention provided that they are edible and aesthetically desirable. Certain common shortening and icing additives such as the high fatty acid esters of sucrose, sorbitol, sorbitan, polyoxyethylene and polyoxyethylene sorbitan; lactic and/or citric acid esters of mono- and/or diglycerides or of other higher fatty acid-containing polyol partial esters; propylene glycol monostearate and the like materials are compatible with the beta-phase shortening and the icing and can be incorporated therein if desired. In particular, from 2% to 6%, by weight of the shortening of polyoxyethylene sorbitan monostearate is useful for improving the texture and sheen of the icing.

It is preferable for a small amount of hydrophilic colloid to be utilized with the aqueous component of the icing. Suitable hydrophilic colloids are Irish moss and caragheen gum, locust bean gum, alginates, agar-agar, gelatin, and water-soluble cellulose ethers such as sodium carboxymethyl cellulose and methyl cellulose. These colloidal materials assist the formation of a smooth dispersion of various other ingredients in the icing. They are preferably used in amounts of from 0.05% to 2% by weight of the icing composition.

Other ingredients such as flavoring; coloring; conventional acidifying agents, such as citric, acetic, and phosphoric acids; sodium chloride and other salts; antioxidants, such as butylated hydroxytoluene, butylated hydroxyanisole, citric acid, and methyl silicone; and conventional mold inhibitors, such as sorbic acid, potassium sorbate, dehydroacetic acid, and sodium benzoate also can be added as minors to the icing of this invention, if desired.

It is preferable to use sorbic acid as a microbial inhibitor in the icing at a concentration ranging from 0.05% to 0.15%, by weight, and to adjust the pH of the icing to 4.5 to 6.0 with a minor amount of an edible acid such as acetic, citric, or phosphoric acid. It is known that such use of sorbic acid provides excellent stability against microbial spoilage of icing for long periods. The use of sorbic acid, potassium sorbate, and sodium benzoate as inhibitors of growth of microorganisms in sundry food products is described in U.S. Patent 2,379,294, and the use of sodium benzoate and citric acid in an icing is described in U.S. Pat. 2,353,307.

The process

In preparing the icing in accordance with the process of the present invention, a melt comprising the sugar and shortening components, and preferably water, must first be formed. As used herein the term "melt" refers to a liquid composition essentially free from solids or crystals. Thus, in forming the melt, the mixture must be heated to a temperature greater than the melting point of all its components. This temperature is greater than about 210° F. and preferably is within the range of from about 210° F. to about 250° F. More preferably, the mixture is heated to a temperature within the range of from about 220° F. to about 240° F. to form the melt.

It is not necessary that the shortening be in its final plastic beta-phase form prior to admixture with the sugar, or that a conventional fondant be prepared. The shortening components (the hardstock, basestock and emulsifier as specified hereinbefore) can be mixed directly with sugar and water, e.g., in a conventional paddle-type mixer, at a temperature of about 100° F. to about 160° F. wherein a slurry of sugar crystals in liquid shortening and sugar is formed. The slurry can then be heated to at least 210° F. to form the necessary melt. Thus, prior to addition to the other components and melting, the shortening can be in the form of its individual ingredients as specified herein, or alternatively, the shortening can be in a previously prepared plastic and/or beta-phase foam.

Prior to the co-crystallization step, the melt is preferably held for a period of time of from about one minute to about ten minutes, to insure complete dissolution of all components. During the holding step, the melt is preferably agitated, e.g., mixed or worked in a picker box, to insure uniform distribution of the sugar and shortening components. Also, during the holding step, the melt is preferably maintained at a temperature within the range of from about 210° F. to about 250° F., and more preferably at a temperature within the range of from about 220° F. to about 240° F.

The melt, preferably at the temperature specified immediately above for the holding step, is then pumped through a scaped wall heat exchanger in which the mixture is chilled to a temperature within the range of from about 55° F. to about 100° F. The melt is preferably chilled to a temperature within the range of from about 70° F. to about 95° F. when a high hardstock content of 25% to 50% is used in the shortening and to a temperature within the range of from about 55° F. to about 70° F. when a low hardstock content of 5% to 25% is used in the shortening. A suitable device for this purpose, referred to as a freezer or "Votator" (trademark), is described by Vogt, U.S. Reissue Pat. No. 21,406. The icing obtained from the freezer is comprised of a co-crystallized mixture of sugar and shortening.

Subsequent to the co-crystallization of sugar and shortening, a beta-phase conversion step is necessary to transform at least 70% of a shortening solids to the beta-phase. Beta-phase conversion can be effected by conventional means, e.g., tempering, high-shear mixing, picking, or a combination thereof.

Preferably, beta-phase transformation is effected by holding the icing composition at tempering conditions, e.g., 90° F. to 130° F. for 12 hours to 36 hours, at any point in the process subsequent to the co-crystallization step.

A preferred method of forming the icing containing beta-phase plastic shortening is described as follows:

From the scraped wall heat exchanger, the chilled supercooled mixture is pumped into containers where the shortening and sugar substantially complete their crystallization. Transformation of the shortening solids to beta-phase then takes place at rest in a tempering room which is held at a temperature of from about 110° to about 120° F. Within a period of about 12 hours after the shortening reaches 110° F., its crystalline structure is converted to predominantly beta-phase crystals. That is, both the beta-phase-tending and non-beta-phase-tending solids will be converted to predominantly beta-phase crystals (70% or greater).

The shortening component of icings prepared in the manner described herein will be plastic and have a substantial interlacing of crystalline particles of very small size. The sugar crystals will also be of a very small size and will be homogeneously distributed with the shortening crystals.

Air or another edible gas such as nitrogen, nitrous oxide, carbon dioxide, octafluorocyclobutane is added to the icing composition in an amount of from about 5% to about 50%, preferably in an amount from about 10% to about 20%, by volume of the icing. Aeration can be accomplished by injecting the edible gas under pressure, e.g., 10 to 400 p.s.i., into the icing mixture subsequent to the formation of the melt. The edible gas can be injected into the mixture prior to the co-crystallization step (after formation of the melt), during the co-crystallization step in the scraped wall heat exchanger, or subsequent to the co-crystallization step, either before or after the beta-phase conversion step.

Preferably, aeration is accomplished subsequent to the crystallization step, and more preferably, subsequent to the beta-phase conversion step by passing nitrogen under a pressure of about 25 p.s.i.g. into the icing composition while agitating, e.g., while mixing in a turbine agitator or paddle mixer.

Minor components of the icing composition, e.g., flavoring and the like, can be added by conventional mixing, e.g., with a paddle-type mixer, preferably subsequent to the beta-phase conversion step and prior to the aeration step. The minor components can be added to the melt but they are preferably not present during the co-crystallization step since the high temperatures of the melt can tend to damage some of these components, e.g., cocoa.

Example.—A storage-stable non-firming aerated icing having improved air dispersion stability was prepared from ingredients as follows:

| Ingredient | Percent by weight | |
|---|---|---|
| Fondant | | 83.355 |
| Water | 15.505 | |
| Dextrose | 5.510 | |
| Sucrose | 78.900 | |
| Hydrophilic colloid (Carragheen gum and algin) | 0.085 | |
| Total | 100.000 | |
| Shortening | | 14.550 |
| Basestock (refined, bleached soybean oil partially hydrogenated to an iodine value of about 85 and a solids content index of 11 at 70° F.) | 58.000 | |
| Hardstock (substantially completely hydrogenated soybean oil and substantially completely hydrogenated rapeseed oil in a weight ratio of 2.5-1 and having an iodine value of 8) | 35.000 | |
| Mono- and diglycerides of partially hydrogenated soybean oil having an iodine value of about 80 | 4.000 | |
| Polyoxyethylene sorbitan monostearate ("Tween 60") | 3.000 | |
| Total | 100.000 | |
| Minors | | 2.095 |
| Salt | 0.500 | |
| 50% citric acid solution | 0.026 | |
| Ascorbic acid | 0.020 | |
| Potassium sorbate | 0.120 | |
| Flavoring, dyes | Balance | |
| Total | 100.000 | |

A fondant was prepared by slowly adding dextrose and sucrose to a dispersion of hydrophilic colloid in water at 145° F. while mixing in a steam-jacketed paddle-type mixer. The shortening components were added to the fondant, the temperature raised to 160° F., and mixing continued for about five minutes until all the shortening solids had dissolved. At this point, the mixture was a slurry of sugar crystals in liquid shortening and sugar. The slurry was passed through a shell and tube heat exchanger to a temperature of about 230° F. and held for three minutes at this temperature while agitation in a picker box mixer until all sugar crystals had dissolved to form a melt.

The melt, at 230° F., was rapidly chilled in a conventional scraped wall heat exchanger (Votator "A" unit) to a temperature of about 91° F.

The icing comprising a co-crystallized mixture of sugar and shortening obtained from the scraped-wall heat exchanger was tempered by holding for 24 hours at 120° F. at which time over 90% of the solid phase of the shortening was in the beta-phase as determined by X-ray diffraction patterns.

After the above-described step wherein the solid phase of the shortening component was converted to beta-phase by tempering, the co-crystallized icing of sugar and beta-phase shortening was placed in a paddle mixer and the minor ingredients were admixed into the icing. Nitrogen under a pressure of about 25 p.s.i.g. was injected into the mixer while agitating until the icing had a gas content of about 11% by volume.

The final icing was very smooth, uniform and homogeneous; it had a pH of 5.6 and a density of 1.11 gm./cc.

The icing has excellent eating and physical qualities including peak and is stable toward slump, bleeding of oil and firming, even after long periods of storage. The air dispersion stability of the icing was exceptionally good as determined by the paucity of holes or pockets of agglomerated air bubbles formed on the surface of said icing when spread on a flat surface with a single stroke of a knife in one direction after having been stored in a sealed metal container under atmospheric pressure for several weeks at a temperature of 100° F. The air dispersion stability grade of the icing was determined subjectively through blind scorings by an expert panel on a rating scale of 1 to 10. The above air dispersion stability grade of 4 is unacceptable; 6 is fair; 8 is good; 9 is very good; and 10 is excellent.

In this example, substantially equivalent results are achieved in that a smooth, uniform and homogeneous icing having exceptionally good air dispersion stability is obtained when the amount of hardstock component in the shortening is about 20% and the melt is rapidly chilled to a temperature of about 60° F.

The icing prepared in the above example was stored for 12 weeks at a constant temperature of 100° F. and the air dispersion stability grade was measured at various intervals, recorded in the table below. As a control, an icing having the same composition as the icing of the above example was prepared exactly as described in Example 1 of U.S. Pat. 3,194,666, i.e., plastic beta-phase shortening was admixed with the sugar components without co-crystallization and minors and nitrogen were subsequently added. This shortening was also stored for several weeks at a constant temperature of 100° F. and the air dispersion grade measured at various intervals, recorded in the table below.

| | Air dispersion stability grade | |
|---|---|---|
| Storage time, weeks at 100° F. | Co-crystallized icing of example | Control |
| 0 | 9 | 8.3 |
| 1 | 9 | 7.5 |
| 3 | 9 | 6.5 |
| 8 | 7 | 6 |
| 12 | 7.5 | |

The above data, which are plotted in the drawing, show that icing processed by the co-crystallization method of the present invention exhibits superior air dispersion stability, especially over long periods of storage, as compared to icing processed by known methods not involving co-crystallization.

What is claimed is:
1. A process for the preparation of a storage-stable, non-firming aerated icing, which comprises:
  (a) heating sugar and normally plastic shortening components comprising from about 50% to about 95% glyceride basestock having an iodine value greater than about 50 and from about 5% to about 50% substantially completely hydrogenated triglyceride hardstock having an iodine value not greater than about 12, at least about 70% of the shortening hardstock being beta-phase-tending; to a temperature within the range of from about 210° F. to about 250° F. to form a melt; and holding the melt with agitation for a period of time of from about 1 minute to about 10 minutes;
  (b) rapidly chilling the melt of step (a) in a scraped wall heat exchanger to a temperature within the range of from about 55° F. to about 100° F. to form an icing comprising a co-crystallized mixture of sugar and shortening; and
  (c) converting at least 70% of the solid phase of the shortening component of the icing of step (b) to the beta-phase, an edible gas having been added to the icing composition subsequent to step (a).

2. The process of claim 1 wherein the temperature of the melt during the holding period is maintained within the range of from about 210° F. to about 250° F.

3. The process of claim 1 wherein the shortening contains 25% to 50% hardstock and the melt in step (b) is chilled to temperature within the range of from about 70° F. to about 95° F.

4. The process of claim 1 wherein the shortening contains 5% to 25% hardstock and the melt in step (b) is chilled to a temperature within the range of from about 55° F. to about 70° F.

5. The process of claim 1 wherein the edible gas is added to the icing composition in an amount of from about 5% to about 50% by volume.

6. A process for the preparation of a storage-stable non-firming aerated icing, which comprises:
  (a) heating sugar, water, and normally plastic shortening components comprising from about 50% to about 95% glyceride basestock having an iodine value greater than about 50 and from about 25% to about 45% substantially completely hydrogenated triglyceride hardstock having an iodine value not greater than about 12, at least about 70% of the shortening hardstock being beta-phase-tending; to a temperature within the range of from about 220° F. to about 240° F. to form a melt;
  (b) holding the melt of step (a) with agitation for a period of time of from 1 minute to about 10 minutes while maintaining a temperature within the range of from about 220° F. to about 240° F.;
  (c) rapidly chilling the melt of step (b) at a temperature within the range of from about 220° F. to about 240° F. in a scraped wall heat exchanger to a temperature within the range of from about 70° F. to about 95° F. to form an icing comprising a co-crystallized mixture of sugar and shortening; and
  (d) holding the icing of step (c) at a temperature of 90° F. to 130° F. for 12 hours to 36 hours to convert at least 70% of the shortening solids to the beta-phase; and
  (e) injecting an edible gas in an amount of from about 10% to about 20% by volume of the icing into the icing of step (d) while agitating.

7. The process of claim 6 wherein the shortening contains 25% to 45% substantially completely hydrogenated triglyceride hardstock having an iodine value not greater than about 12, said substantially completely hydrogenated triglyceride consisting essentially of beta-phase-tending hardstock and non-beta-phase-tending hardstock in a weight ratio of from about 9:1 to about 1:1, at least about 70% of the shortening hardstock being beta-phase-tending.

References Cited
UNITED STATES PATENTS

| | | | |
|---|---|---|---|
| 3,014,802 | 12/1961 | Hellman | 99—134 |
| 3,056,678 | 10/1962 | Pentzlin | 99—86 |
| 3,194,666 | 7/1965 | Bedenk et al. | 99—139 |
| 3,253,928 | 5/1966 | Bedenk et al. | 99—139 |
| 3,307,953 | 3/1967 | Siebers | 99—23 |

MAURICE W. GREENSTEIN, Primary Examiner

J. M. HUNTER, Assistant Examiner